PACK FOR MAGNETIC SOUND RECORD SHEETS

Filed Sept. 26, 1958

3 Sheets-Sheet 1

Oct. 30, 1962 YASUSHI HOSHINO ETAL 3,061,085

PACK FOR MAGNETIC SOUND RECORD SHEETS

Filed Sept. 26, 1958 3 Sheets-Sheet 2

Oct. 30, 1962 YASUSHI HOSHINO ETAL 3,061,085

PACK FOR MAGNETIC SOUND RECORD SHEETS

Filed Sept. 26, 1958 3 Sheets-Sheet 3

United States Patent Office 3,061,085

Patented Oct. 30, 1962

3,061,085
PACK FOR MAGNETIC SOUND RECORD SHEETS

Yasushi Hoshino, 462 1-chome, Tamagawa Okusawa-cho, Setagaya-ku, and Mamoru Namikawa, 664 Kugahara-cho, Ota-ku, both of Tokyo, Japan, and Shigezo Tochihara, Kawasaki-shi, Kanagawa, Japan (531 Matsunoki-Jyutaku, Matsunoki-cho, Suginami-ku, Tokyo, Japan)

Filed Sept. 26, 1958, Ser. No. 763,652
Claims priority, application Japan Nov. 20, 1957
4 Claims. (Cl. 206—57)

This invention relates to magnetic record sheets and more particularly to arrangements for the same.

A magnetic sound transducing machine and a magnetic sound record sheet which is used on said machine are described in detail in our applications Ser. No. 578,911/1956 (now abandoned), No. 578,912/1956 (now abandoned), No. 579,004/1956 (now abandoned), No. 635,-504/1957 now Patent 3,022,078, and No. 635,335/1957, now Patent 2,924,668.

The above noted machine has a turn table provided with a plurality of sound recording or reproducing heads arranged at equal intervals on the circumference thereof and the turn table is advanced in a linear direction while it is rotated.

The magnetic sound record sheet has on one surface descriptions, pictures or the like, and on the other surface a magnetic coating film demarcated by two parallel lines. When the magnetic sound record sheet is set on the magnetic sound record reading machine, the heads of the turn table of the machine scan the magnetic film of the sheet one by one to record sound on the magnetic coating film or to reproduce sound recorded on said film.

In the operation of such a magnetic sound record reading machine, it is important to set the sheet in correct position in relation to the turn table so that the center of the turn table will pass linearly along the center line of the magnetic film of the sheet for securing satisfactory recording or reproducing of sound. For this purpose, the sheet is provided with setting holes and the machine is provided with guide pins, the sheet being set on the machine by engaging the holes and the guide pins.

It is, however, troublesome and requires much time to set a number of magnetic sound record sheets on the machine one by one, when a long series of magnetic sound record sheets is employed. Moreover, the frequent interruptions required will decrease the interest of those hearing the record.

An object of the present invention is to eliminate such disadvantages in employing a series of magnetic sound record sheets.

According to the present invention, a pack is provided which accommodates a number of sound record sheets therein as a pile, each sheet being kept in correct position with the setting holes in alignment. When the pack is set on a magnetic sound transducing machine, the center line of the magnetic coating film of each sheet is located in a vertical plane containing the line of linear motion of the center of the turn table of the machine, and the magnetic coating films of the sheets are scanned perfectly one by one by the simple operation of withdrawing the lowest sheet when the use of said sheet is completed.

The details of the present invention will be explained hereunder with reference to accompanying drawings wherein FIG. 1 is a perspective view of a pack according to the present invention, a part of which is broken away to show the inside of the pack;

FIG. 16 is a bottom view of the same pack.

Figures 1, 2, 3, 4, 5, 7:
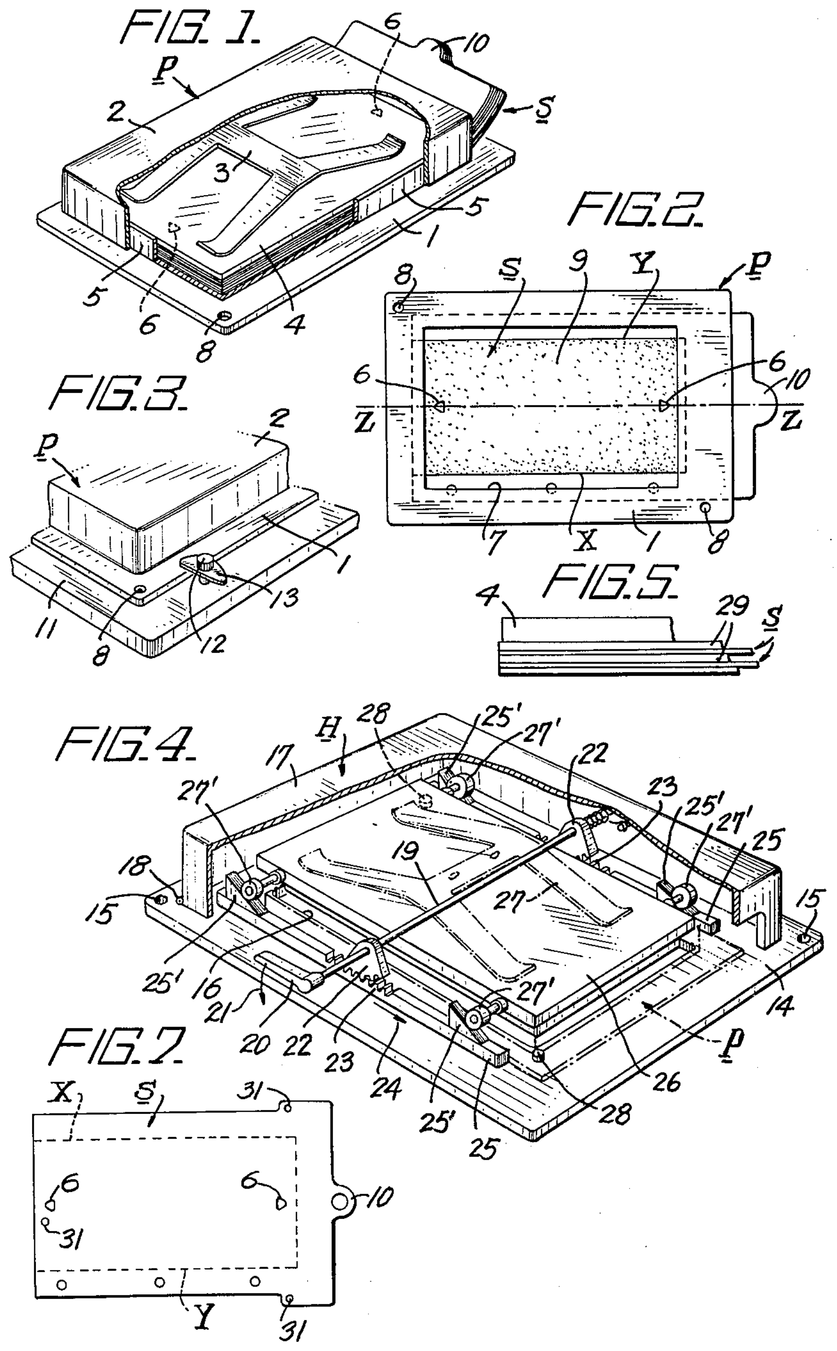
FIG. 2 is a bottom view of the pack of FIG. 1 viewed from below.
FIG. 3 is a view of a device for fixing the pack on the panel of a magnetic sound transducing machine.
FIG. 4 is a perspective view of a pack holder which has a device for applying and releasing pressure on a pile of sheets in a pack held by said holder.
FIG. 5 is a side view of a pile of magnetic sound record sheets in which a hard sheet or a magnetic field shielding sheet is inserted between magnetic sound record sheets.
FIG. 7 is a plan view of a magnetic sound record sheet taken from the pile of FIG. 5.

The pack illustrated in FIGS. 1 and 2 has a base plate 1 provided with a window 7 and a cover 2 and contains a number of magnetic sound record sheets S in a pile, each sheet having a magnetic coating film 9 facing downwardly. A plate 4 is placed on the pile of sheets and a spring 3 fixed on the cover 2 acts to press against the sheets through the plate 4 from above. The pack has a box-like frame 5 integral with the base plate 1 and the sheets S are accommodated in the box in such a way that the sheets are maintained in a stack in a fixed position. Each sheet has setting holes 6, 6 in positions corresponding to the guide pins of a magnetic sound transducing machine and when the sheets are accommodated in the pack in a pile, the setting holes of all the sheets are in alignment. On the panel of the magnetic sound transducing machine, guide pins are provided and, on the base plate 1 of the pack, holes 8 are provided in positions corresponding to guide pins. The positions of the guide pins and through holes must be so selected that when the pack is set on the panel, by engaging the pins and the holes, the center line Z—Z of the magnetic coating film demarcated by two parallel lines X and Y of all the sheets in the pack is in the vertical plane containing the line of the linear motion of the center of the turn table of the magnetic sound record reading machine.

In such a condition, the magnetic coating film of the lowest sheet in the pack will be exposed downwardly from the window 7 of the base plate 1 of the pack, and recording or reproducing of sound can be effected by the heads of a turn table operated below the pack.

When recording or reproducing of the lowest sheet is completed, the sheet is withdrawn from the pile by means of a projection 10 so that the magnetic coating film of the next sheet is exposed facing the sound recording or reproducing heads of the turn table. The removal of the lowest sheet can thus be accomplished by a short simple operation and therefore the disadvantages caused by troublesome time consuming operations for conventionally changing a sheet can be eliminated.

The setting of sheets in the pack may be effected by utilizing the setting holes of a sheet for the purpose of setting the sheet directly on a magnetic sound reading and reproducing machine. However, if such a hole is utilized in setting the sheet in a pack, said setting hole will be torn by the setting pin accommodated in the hole when the sheet is withdrawn from the pack and the sheet will become unsuitable for any further use. If the setting pin is sunk when the sheet is withdrawn from the pack, damage of the setting hole is prevented. However, sinking of the setting pin is not only troublesome but also makes the construction of the pack complicated. Accordingly, in the present invention, special holes 31 for setting the sheet in the pack by engagement with the setting pins 30 of the pack are provided in the sheet separately from the main setting holes 6 for setting the sheet directly on a magnetic sound recording and reproducing apparatus. The holes 31 must be positioned in the sheet in a part the tearing of which does not cause any harmful effect. In other words, the holes must be positioned in the part where neither sound record nor the main setting holes are present. The tearing of such part will not affect the sound reproduction of the sheet, and the sheet withdrawn from the pack can be used repeatedly on a magnetic sound record reproducing machine, by setting the sheet on the machine by means of the engagement between the main setting holes of the sheet and the setting pins of the machine.

Fixing of a pack P of sheets on the panel of a machine may be effected by engagement between the setting holes 8 of the base plate 1 of the pack and guide pins on the panel. However, said fixing may also be attained by other suitable means. For example, in FIG. 3, a fixing element 13 which is clamped by a threaded cap 12 is another means for fixing a pack on a panel of a machine.

FIG. 4 illustrates a pack holder which may be used in cooperation with certain types of holders as explained hereinafter.

As shown in the drawing, the holder has a base plate 14 provided with setting holes 15 to be used for setting the holder on a panel of a machine or directly on said machine. On the base plate 14, a cover 17 is provided which is swingably fixed by hinges 18 to be opened or closed. On both sides of the plate 14, a rod 25 is slidably arranged. This rod 25 is formed as a rack 23 in its middle portion and has ramp elements 25′ on its ends as shown in the drawing. The cover 17 has a transverse shaft 19 and said shaft has two sector gears 22 which mesh with the racks 23 when the cover is closed. A spring 27 is provided on the cover to press against plate 26. This plate 26 is supported by rollers 27′ resting on the elements 25′ and is thus movable up and down when the rods 25 are moved.

For moving the rods 25, the shaft 19 is rotated by a handle 20 fixed thereon and rotated in the direction of arrow 21 to rotate the sector gears 22. Then the rods 25 are moved in the direction of arrow 24 and the rollers 27′ are raised by the members 25′ to lift the plate 26.

When the handle is released, the rod will be moved automatically in reverse direction to the original position under the pressure of the spring 27 acting through the pressing plate 26, the rollers 27′ and the members 25′. Thus the pressing plate 26 can be raised and lowered easily. This pressing plate is used for applying or releasing pressure on a pile of sheets of a pack held by the holder as explained later with reference to a simplified pack illustrated in FIGS. 14–16.

FIG. 5 illustrates a pile of magnetic sound record sheets accommodated in the pack of the present invention. In some csaes, the sheets may be made of thin flexible material. In such a case, the contact between the head of a turn table and the magnetic film of the lowest sheet of the pile may become imperfect in sound recording and reproducing operations. Further, when the sheets are thin, the magnetic field applied to the lowest sheet may affect sheets located above the lowest sheet. In order to prevent this, a hard plate 29 is inserted between the sheets S in FIG. 5. This sheet 29 may be inserted alternately with the sheets S or may be inserted between every few sheets. When shielding of a magnetic field is desired, the hard sheet 29 may be coated with powder or foil of a material of high magnetic permeability such as iron or a suitable alloy to perform such a function.

Figures 6, 8, 9, 10, 11, 12:
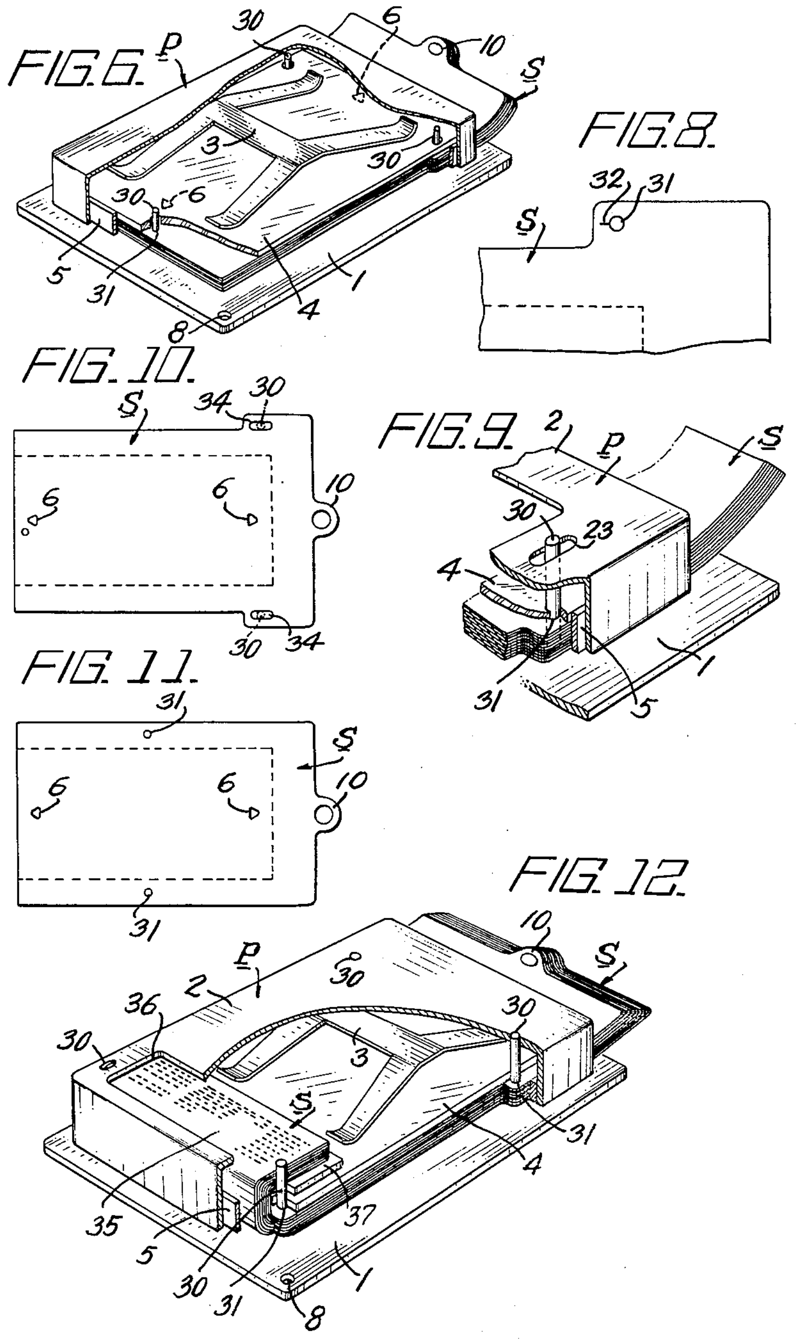
FIG. 6 is a perspective view of another embodiment of this invention.
FIG. 8 is a partial plan view of a magnetic sound record sheet which has a rift adjoining a hole for setting the sheet in a pack.
FIG. 9 is a partial perspective view of another pack according to this invention which has a device to compensate for shrinkage and elongation of the sheets due to changes of humidity and temperature.
FIGS. 10 and 11 are plan views of magnetic sound record sheets which may be accommodated in the pack illustrated in FIG. 9.
FIG. 12 is a perspective view of another embodiment of the invention, wherein writing or observation of descriptions on the sheets is possible while sound is recorded or reproduced.

FIG. 6 is another embodiment of the pack of the present invention. In the pack of FIG. 1, when the lowest sheet is pulled out from the pack, there is a tendency for the other sheets to be moved from their right position and they must be held in their position with care. In the embodiment of FIG. 6, all the sheets S are provided with a hole 31 which is different from the setting hole 6. A guide pin 30 is provided on base plate 1 of the pack for engagement with the hole 31 of the sheets. When the lowest sheet is pulled out for removal, said sheet is torn at the hole 31 by the guide pin 30 but other sheets are held in position by the pin 30. The tearing of the sheet caused by the pin 30 will not cause any serious disadvantage if the position of the hole is properly selected particularly when the hole 31 is provided with a rift 32 as shown in FIG. 8 to facilitate the tearing and to control the direction of the tearing. The rift 32 is also useful for preventing any remnant of the torn sheet from remaining in the pack.

When the sheets S are made of a material such as paper, they may have tendency to elongate or shrink under the influence of changes of humidity and temperature and to be unduly stretched or slackened in the pack. Under such conditions, perfect sound recording or reproducing will be made difficult.

FIGS. 9, 10 and 11 illustrate some examples of a device for compensating for such elongation or shrinkage. In these embodiments, the two pins 30 on the right side in FIG. 6 are mounted on the base plate 1 of the pack to be urged outwardly by means of springs (not shown) while the other pin 30 on the left side is fixed on the base plate 1 of the panel and the hole 23 (FIG. 9) of the cover is made in the shape of an elongated slot to allow for movement of the pin 30. According to elongation and shrinkage of the sheet, the pin is moved to stretch the sheet with proper force and thus the sheet may be maintained in properly stretched condition. When the holes 31 are formed as shown in FIG. 11 on both sides the sheet may be stretched in the direction of the width by providing pins (not shown) on the base plate 1 which are adapted to engage the holes (31) and to be urged outwardly in the direction of the width by means of springs (not shown). The holes of the sheets may also be made in elongated form as shown at 34 in FIG. 10 so that there will be no tearing of the sheet due to excessive shrinkage during storage in the pack.

FIG. 12 illustrates a pack which allows simultaneous writing or reading of a description on a part of a magnetic sound record sheet while recording or reproducing sound on the sheet. In this embodiment, the sheet S has a bent part 35 on one end on which descriptions are made. The cover 2 of the pack has a window 36 to allow writing or the observation of descriptions on the bent part 35 and below the bent part there is a table plate 37 for supporting the bent part 35. On the bent part 35, descriptions may be made while recording sound on the magnetic coating film of the sheet or a description may be read while hearing sound recorded on the magnetic coating film.

Figure 13:
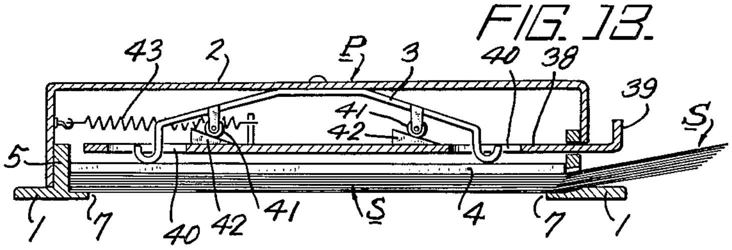
FIG. 13 is a sectional view of a pack which has a device for applying and releasing pressure on magnetic sound record sheets accommodated in the pack.

FIG. 13 is another embodiment of the invention. In the packs already explained, the sheets in the pack are always pressed by a spring through a pressing plate even when the lowest sheet is withdrawn from the pack. Under such condition, the operation of withdrawal is sometimes difficult and further has a tendency of moving other sheets from the right position. In the embodiment of FIG. 13, a pressing plate 4 is normally pressed by a spring 3 fixed on a cover 2 of the pack P, but when the lowest sheet is withdrawn, the pressure on the plate 4 is released to eliminate the disadvantages as described above.

The mechanism for releasing the pressure is as follows. In the pack, a horizontal plate 38 which has two ramp elements 42 fixed thereon is arranged. This plate has wide windows 40 through which the ends of the spring 3 protrude to act on the pressing plate 4. The spring 3 is provided with rollers 41 which rest on the elements 42 of the horizontal plate 38. Normally the plate is pulled to left position by a spring 43 and the lower portion of the members 42 is in contact with the rollers 41 of the spring 3 so that the action of the spring 3 on the pressing plate 4 is not hindered. However, the plate 38 may be pulled to right by the handle 39 of said plate and, when pulled, the elements 42 will raise the rollers 41 of the spring 3, thereby raising the spring 3 from the pressing plate 4. Thus the pressing plate 4 is released from the pressure of the spring 3 and the lowest sheet S may be withdrawn freely from the pack. When the handle 39 is released, the horizontal plate 38 is returned to its original position by the action of the spring 43 and the pressure of the spring 3 will be applied again to the pressing plate 4.

Figure 14:
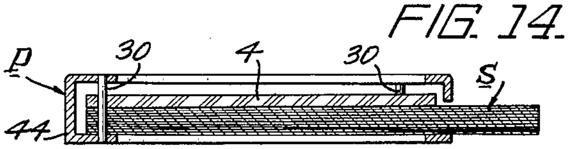
FIG. 14 is a sectional side view of a simplified pack.
Figure 15:
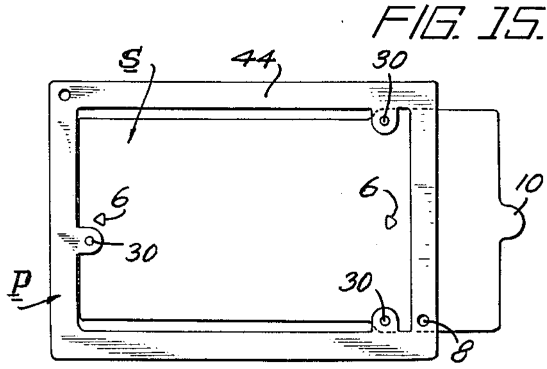
FIG. 15 is a top view of the pack of FIG. 13.
Figure 15:
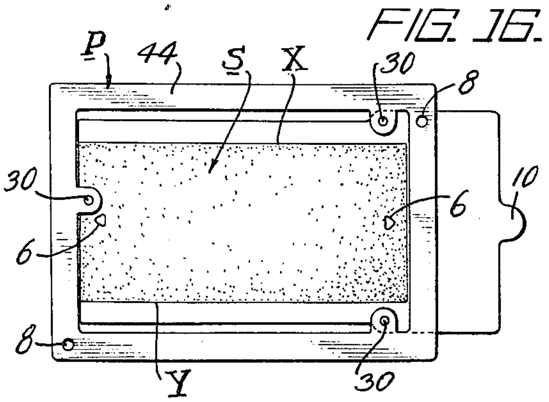

FIGS. 14, 15 and 16 illustrate another embodiment of the pack according to the present invention which is simplified by eliminating the pressing spring.

The packs having a pressing spring as illustrated in FIGS. 1, 6, 12 and 13 are all satisfactory in operation, but their constructions are somewhat complicated and accordingly they are relatively expensive. If the pack is intended to be used only once and then thrown away, it is desirable to reduce the cost of the pack as much as possible. The embodiment of FIGS. 14–16 is contemplated to meet such requirement.

In the drawings, S is a pack of magnetic sound record sheets and 44 is a frame of very simple construction made of a material such as plastic, metal or the like. The frame has pins 30 and a number of sheets S are placed in the frame 44 in a fixed position by engagement of holes 31 provided in the sheets with the pins 30. When the lowest sheet is withdrawn after completion of reproduction of the sound of said sheet, the magnetic coating film of the next sheet will be exposed from the bottom window of the frame to have contact with the heads of a turn table of a magnetic sound reproducing machine. Since all of the sheets are kept in a definite position by the engagement of the pins 30 of the frame, the withdrawal of one of the sheets from the bottom will not act to move the sheets above the withdrawn sheet in relation to the frame 44. In other words, the setting holes 6, 6 of all the sheets will always be kept in correct position in relation to the frame 44. The frame 44 has holes 8 which are adapted to engage with the pins 28 of a pack holder as illustrated in FIG. 4. On the pile of sheets in the pack, a pressing plate 4 is provided but there is no pressing spring in the pack itself.

This simple pack is used in conjunction with a pack holder of FIG. 4 which is permanently and repeatedly used. In the use of this simple pack, the pack is placed in the pack holder by engaging the holes 8 of the frame 44 of the pack with the pins 28 of the pack holder of FIG. 4 as described above. In setting the pack in the pack holder, the cover 17 of the pack holder is of course turned up to its open position. After placing the simple pack in position on the base plate of the pack holder of FIG. 4, the pressing plate 26 of the pack holder is placed on the pressure plate 4 of the simple pack and then the cover of the pack holder of FIG. 4 is turned down. The spring 27 of the pack holder presses down the pressing plate 26 of said holder to press the pressure plate 4 of the simple pack thereby to press the pile of the sheets S of the simple pack. Thus, despite the absence of a spring in the simple pack, the sheets in said pack can be effectively pressed down by means of the spring and the spring 27 and the pressing plate 26 of the pack holder of FIG. 4. When it is desired to release the pressure applied on the pile of sheets for the withdrawal of the lowest sheet, such release can be easily obtained by the operation of the handle 20 of the shaft 19 of the holder of FIG. 4, and thus the effect and the function of the embodiment of FIG. 13 may also be obtained by simple operation.

What is claimed is:

1. For use with a magnetic sound transducing machine including a panel plate provided with registration pins and a turntable provided with sound transducing heads, the turntable being adapted both for rotary movement and for linear movement along the longitudinal center line of the panel plate, said machine also including further pins in positions different from said registration pins; a pack structure including a base plate provided with holes adapted for engaging said further pins, a plurality of magnetic record sheets including magnetic record films, means on said base plate for maintaining said sheets in a stack in predetermined position on said base plate whereby with the holes in said base plate engaged with said further pins the lowermost sheet in the stack is in position to be scanned by said heads, and means on said base plate for urging the sheets towards said base plate, the means for maintaining the sheets in position on the base plate define holes provided in like parts of each sheet and include pins on said base plate for engagement with the latter said holes, the said parts of the sheets being spaced from the associated magnetic record films.

2. For use with a magnetic sound transducing machine including a panel plate provided with registration pins and a turntable provided with sound transducing heads, the turntable being adapted both for rotary movement and for linear movement along the longitudinal center line of the panel plate, said machine also including further pins in positions different from said registration pins; a pack structure including a base plate provided with holes adapted for engaging said further pins, a plurality of magnetic record sheets including magnetic record films, means on said base plate for maintaining said sheets in a stack in predetermined position on said base plate whereby with the holes in said base plate engaged with said further pins the lowermost sheet in the stack is in position to be scanned by said heads, and means on said base plate for urging the sheets towards said base plate, said structure further comprising a cover on the base plate and wherein the means pressing the sheets in the pack against the sound transducing heads comprises a pressure plate on the pile of the sheets in the pack and a spring on the cover and adapted to press against the pressing plate.

3. A pack structure as claimed in claim 2, comprising means on said base plate for lifting the pressing plate in order to facilitate withdrawal of sheets from the pack structure.

4. For use with a magnetic sound transducing machine including a panel plate provided with registration pins and turntable provided with sound transducing heads, the turntable being adapted both for rotary movement and for linear movement along the longitudinal center line of the panel plate, said machine also including further pins in positions different from said registration pins;

a pack structure including a base plate provided with holes adapted for engaging said further pins, a plurality of magnetic record sheets including magnetic record films, means on said base plate for maintaining said sheets in a stack in predetermined position on said base plate whereby with the holes in said base plate engaged with said further pins the lowermost sheet in the stack is in position to be scanned by said heads, and means on said base plate for urging the sheets towards said base plate, each sheet includes a bent longitudinal extension adapted to be folded back and to provide for visual indicia, said pack structure further comprising a supporting table to support the bent extensions of the sheets.

References Cited in the file of this patent

UNITED STATES PATENTS

| | | |
|---|---|---|
| 2,792,933 | Butlin | May 21, 1957 |
| 2,843,386 | Stanton et al. | July 15, 1958 |
| 2,870,905 | Holohan | Jan. 27, 1959 |